United States Patent [19]

Buhrer et al.

[11] Patent Number: 4,955,686
[45] Date of Patent: Sep. 11, 1990

[54] OPTICAL FIBER CROSSCONNECT SWITCH

[75] Inventors: Carl F. Buhrer, Framingham; W. John Carlsen; Sarah S. Cousins, both of Boston; Alfred H. Bellows, Wayland, all of Mass.

[73] Assignee: GTE Laboratories Incorporated, Waltham, Mass.

[21] Appl. No.: 367,909

[22] Filed: Jun. 16, 1989

[51] Int. Cl.⁵ .................................. G02B 6/36
[52] U.S. Cl. ............................ 350/96.20; 350/96.15
[58] Field of Search ............... 350/96.20, 96.15, 96.23

[56] References Cited

U.S. PATENT DOCUMENTS 4,830,444  5/1989  Cloonan et al. ............. 350/96.15 X

FOREIGN PATENT DOCUMENTS

| 53-29223 | 9/1979 | Japan | 350/96.15 |
| 55-159402A | 12/1980 | Japan | 350/96.13 |
| 62-125995A | 6/1987 | Japan | 350/96.20 |
| 2200222A | 7/1988 | United Kingdom | 350/96.15 |

Primary Examiner—Frank Gonzalez
Assistant Examiner—Phan T. Heartney
Attorney, Agent, or Firm—James J. Cannon, Jr.; Victor F. Lohmann, III

[57] ABSTRACT

A true n-by-n optical crosspoint matrix switch has n optical fiber outputs each carrying the same light that entered the switch at one of n fiber inputs, maintaining the full optical spectral characteristics although the polarization states may be modified. A mounting plate on a patch panel has an n-by-n array of connection adapters in n rows and no columns. An electromechanical positioning mechanism is utilized to position n input fibers along one row to any of n adapter positions each in a different column on a first side of said plate, and n output fibers along one column to any one of n adapter positions, each in a different row on a second side of said plate. Any input fiber can be connected to any output fiber and none of the adapters are shared by more than one input or one output connector. The electromechanical positioning mechanism includes a pair of cam driven walking legs supporting a fiber carrier one for each column on the first side of said plate and one for each row on the second side of said patch plate. The fiber carriers step linearly from one adapter position to the next, raising and lowering the fiber to break or make connections.

16 Claims, 4 Drawing Sheets

OPTICAL FIBER CROSSCONNECT SWITCH

Background of the Invention

This invention pertains generally to the field of fiber optic communications, and particularly to the field of true optical switching in which an output fiber carries the same light that entered the switch on an input fiber. Specifically, it pertains to an electromechanical n-by-n optical crosspoint matrix switch.

Optical fibers have become a principal transport medium for carrying telecommunication signals from point to point. A fiber optic link has at its input end a modulated light source, usually a semiconductor laser diode, and at its output end a detector for the optical energy. Both of these terminating devices interface with electronic circuits that process the signals to and from the format used on the optical fiber link. Such formats are chosen to enable the link to carry wideband data and/or highly multiplexed electronic signals containing components from thousands of telephone users.

Vital to any telecommunication system is the switching function. Installed circuits must be made available to numerous different users at different times. This function has evolved from the plug and jack switchboard, through relay type electromechanical devices to electronic switching of digitized signals multiplexed in the time domain using complex integrated circuit technology. Circuit switching, as it is now called, is now most easily implemented where the signals are in electronic rather than in photonic form. This is because individual circuits are carried as digital data in specific time slots of time domain multiplexed signals, and their switching to a different time slot requires a memory function not easily achieved with light. Nevertheless, fast electrically controlled optical switches have been developed using integrated optics technology. A basic element is a two-by-two optical crossconnect switch employing guided waves in a planar waveguide on an electro-optic substrate such as lithium niobate. These may be cascaded to form an n-by-n crossconnect switch. (M. Kondo et al., "Integrated optical switch matrix for single-mode fiber networks, "IEEE J. Quantum Electron. QE-18, No. 10 pp. 1759–1765, October 1982.) But this type of switch requires light on the input fiber to be polarized and efficiently coupled to the planar waveguides. Also, the switching is never complete, and signal crosstalk among the n inputs and n outputs degrades the device performance particularly when several switching stages are cascaded. A fast magneto-optical two-by-two switch has been described which does not require polarized input. (M. Shirasaki et al., "Bistable magneto-optic switch for multimode optical fiber, "Appl. Opt. 21, No. 11, pp. 1943–1949, June 1982; M. Shirasaki et al., "Nonmechanical optical switch for single-mode fibers, "Appl. Opt. 21, No. 23, pp. 4229–4234, December 1982; M. Shirasaki et al., "Magneto-optical 2×2 switch for single-mode fibers, "Appl. Opt. 23, No. 19, pp. 3271–3276, October 1984.) It uses polarizing beam splitters to separate the two polarization components and recombine them again after they pass through a Faraday rotation element. Cascading these to form an n-by-n switch would also lead to high insertion losses and crosstalk.

Two optical crosspoint switches previously described do not switch light at all. (U.S. Pat. Nos. 4,074,142 and 4,381,881) They have n input and n output electrical signals that are selectively interconnected using light produced by internal light emitting diodes and detected by internal optical detectors. The light is used only to provide a signal path between all inputs and all outputs, the selection being accomplished by electrical gating means either at the light emitting diodes or at the detectors. The utility of both of these switches is limited.

A true n-by-n optical crosspoint matrix switch has n fiber outputs each carrying the same light that entered at one of the n fiber inputs. The full optical spectral characteristics are thereby maintained although the polarization states may be modified.

The switchboards and relays originally used for circuit switching were slow, but the time domain multiplexed signals used today require fast digital circuitry. A second type of switching which can be much slower is used to reconnect transmission facilities for testing or replacement. Such facilities switching of optical fibers is required in photonic transmission systems to test the integrity of the fiber link and locate faults, to test the electro-optical interfaces, or to reconfigure the fiber link with alternative interface devices. Optomechanical devices which employ the movement of beam redirection devices such as mirrors and prisms are suitable for facilities switching. Six two-by-two switches each using a glass prism to exchange the light in two parallel beams were cascaded to give a four-by-four matrix switch (U.S Pat. No. 4,322,126). A similar prism of improved design was also used to construct a specific type of facilities switch for standby protection of eight laser transmitters (U.S. Pat. No. 4,634,239). Two other types of prisms may be used to construct true eight-by-eight optical crosspoint switches. (J. Minowa et al., "Non-blocking 8×8 optical matrix switch for fiber optic communication," Electron Lett. 16, No. 11, pp. 422–423 1980; and R. Watanabe et al., "One by two optical switch using new type of pentagonal prism," Electron. Lett 16, No. 7, pp. 257–259 1980.) But in these the angular orientation of each movable prism is critical and difficult to achieve in practice with the precision needed for single-mode fiber. In all of these switches, the input optical fibers are terminated in rigidly fixed expanded beam connectors containing a lensing device to form beams which are then intercepted by moving mirrors or prisms to divert them to other rigidly fixed expanded beam connectors on output fibers. None of these switches makes use of the flexibility of the fibers connected to them.

Various types of fiber optic connectors have been devised. Some bring the core of one fiber which is at the center of an accurately cleaved end against the core of a second fiber. These butt connectors have the fiber cemented in the hole of a precision ferrule such that the fiber core is coaxial with the outer cylindrical ferrule surface. An adapter into which two ferrules are accurately aligned allows the cores to precisely contact for maximum light transfer. In another type of connector, light diverges from the core at the end of an accurately cleaved fiber and is focussed into a parallel beam by a small lens after it expands to a few hundred microns in diameter. These expanded beam connectors are also brought together in an adapter so that the parallel beams from each align both laterally and angularly thereby completing the optical connection. They have a greater tolerance for lateral misalignment than the butt connectors, but require more accurate angular alignment.

Summary of the Invention

The principal object of this invention is to provide a remotely controllable electromechanical fiber optic crossconnect matrix switch capable of connecting a multiplicity of input fibers to an equal number of output fibers in any combination.

Another object is to provide an electromechanically operated patch panel that can join n input fibers each terminated by a standard connector with n output fibers each terminated by a standard connector device.

In a first aspect of the invention, a preferred embodiment is an eight-by-eight optical fiber crossconnect switch designed for use with expanded beam connectors. Typically, interconnecting n fiber circuits requires n adapters, and these are often mounted through a plate in a patch panel configuration. The n input fibers are each terminated in a connector, and the input fiber connectors are inserted into the adapters on one side of the patch panel plate and the n output fibers are each terminated in a connector and the output fiber connectors are inserted into the same n adapters on the other side of the plate. Any one of the n factorial possible interconnections may be achieved by rearranging the connectors on either side of the patch panel. In the present invention, an n-by-n array of adapters in n rows and n columns is mounted through a flat plate or integrally fabricated with the plate itself. On one side of the plate n input connectors are each repositionable along one row to any of n positions each in a different column, while on the other side of the plate n output connectors are each repositionable along one column to any of n positions each in a different row. Thus, any input fiber can be connected to any output fiber, and because none of the adapters are shared by more than one input or one output connector, this optical fiber crossconnect switch is nonblocking. Moreover, because the connectors on any one side are moved along nonintersecting straight lines, the fibers attached to them cannot become entangled even after multiple reconnections of the switch.

In a second aspect of the invention, the connector repositioning motion is provided through a carrier into which the connector is mounted, and the repositioning motion consists of a withdrawal of the connector from one adapter hole in the flat plate, a lateral translation along its row or column, and a reinsertion of the connector into an adjacent adapter hole. A remotely controllable electromechanical system is utilized for the physical repositioning of the connectors on each side of the plate.

Description of the Preferred Embodiment

Figure 1:
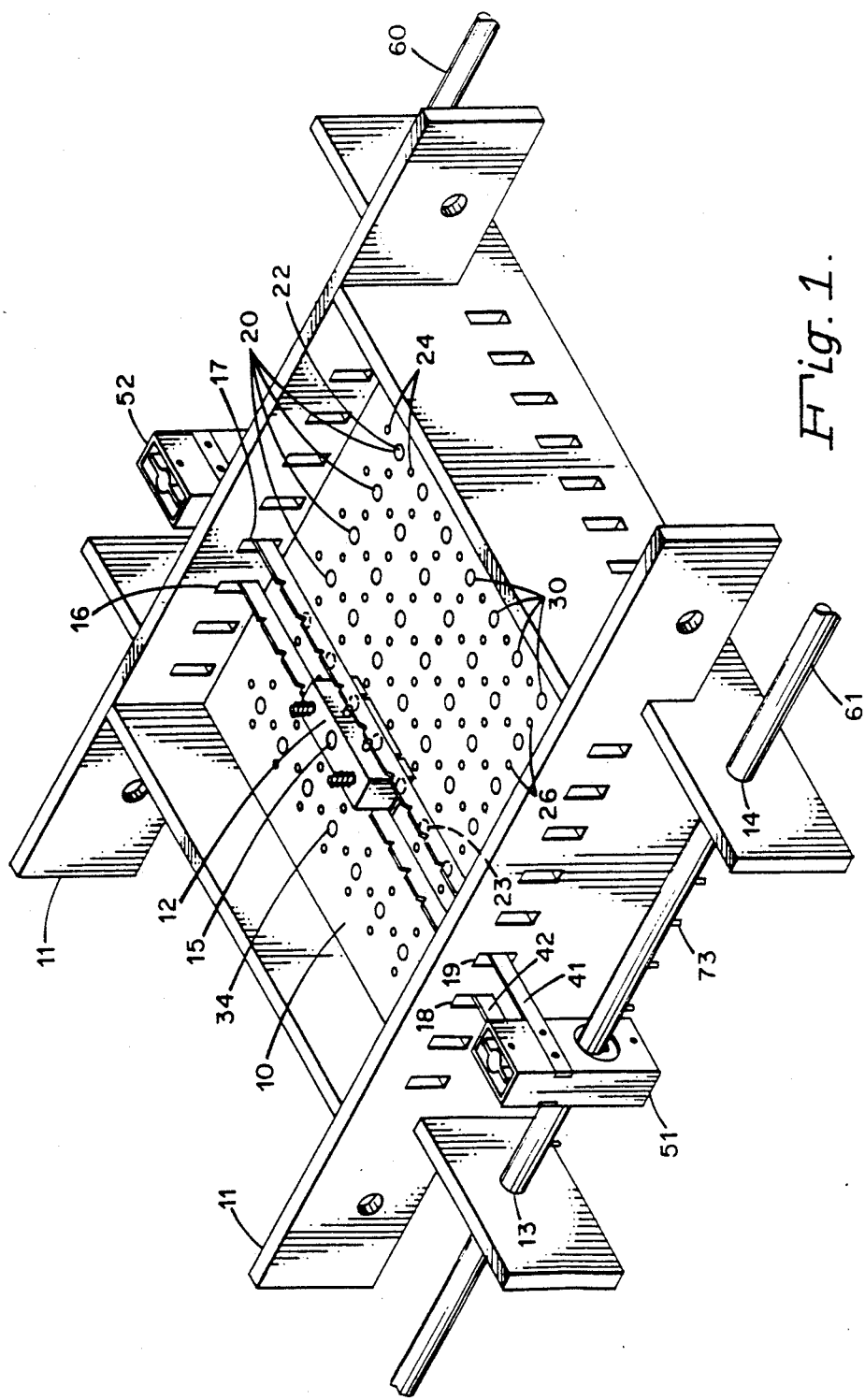
FIG. 1 is a perspective view of the principal features of the preferred embodiment of an optical fiber crossconnect matrix switch, according to the invention.

The present invention pertains to an electromechanical n-by-n optical crosspoint matrix switch in which n input optical fibers each terminated in a standard connector device may be connected to n output optical fibers each terminated in a standard connector device through n adapters selected from an n by n matrix of adapters to provide true photonic switching. A preferred embodiment of the present invention is shown in FIG. 1. For purposes of illustration, the embodiment shown is an eight-by-eight optical fiber crossconnect switch designed for use with expanded beam connectors. It should be understood that different size arrays and different means of connecting optical fibers may be utilized without deviating from the invention.

Figure 5B:
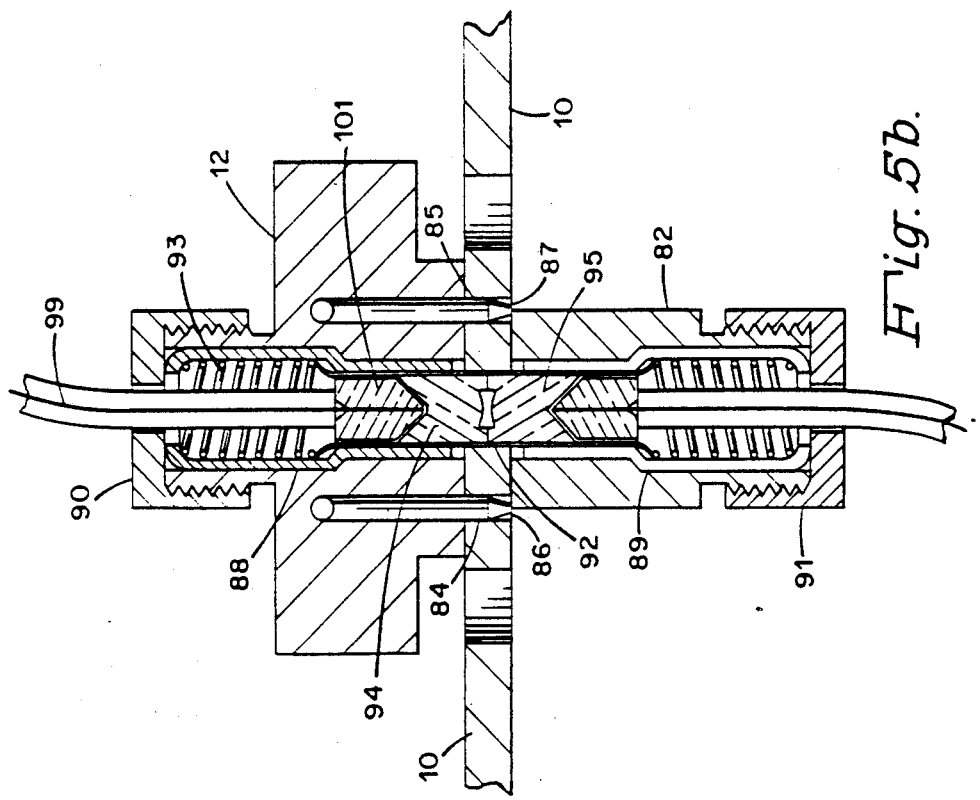
FIG. 5b is a cross-sectional view of an expanded beam connector and repositioning carrier which may be used in the crossconnect switch of FIG. 1.

As illustrated in FIG. 1, an 8-by-8 array of adapters 22 in n rows 20 and n columns 30 is mounted through a flat plate 10 or integrally fabricated with said plate 10. Plate 10 is mounted in a frame 11 having side walls extending above and below plate 10, as well as beyond plate 10 in all directions On a first side of said plate 10 n input connectors (not shown) are repositionable along one row 20 to any of n positions, each in a different column 30, while on a second side of said plate 10, (not visible in FIG. 1) n output connectors are each repositionable along any one column 30 to any of n positions each in a different row 20. For this disclosure, the adapters are illustrated and described as adapter holes, since the details of the optics within the adapter holes depend on the type of connector to be repositioned (see FIG. 5b and infra). To avoid cluttering the drawings, the means to reposition a connector is shown for only one row, and the optical fiber terminated in the connector is shown in FIG. 5b only. In the example shown in FIG. 1, one optical connector (FIGS. 5a, 5b) is mounted through vertical hole 15 in one repositioning carrier 12 shown positioned above an adapter hole 22 in plate 10, located in the third row 23 and fourth column 34 of the eight rows and columns of adapter holes 22 in plate 10. The eighth row 20 and eighth column 30 are not visible in FIG. 1. Carrier 12 can be repositioned to any of the eight adapter holes 22 in third row 23, and seven additional carriers (not shown) can each be repositioned to any of the eight adapter holes 22 in their respective rows 20. Surrounding each adapter hole 22 in each row are two smaller alignment holes 24. These accommodate two pins (FIG. 5b) protruding from the bottom of carrier 12 and align hole 15 and the connector passing therethrough with the adapter hole in plate 10. The reverse side of plate 10 (not shown) has the same array of adapter holes 22, but the eight connector carriers being repositioned thereon are turned parallel to the columns 30 and can be repositioned to any of the eight adapter holes 22 in their respective columns 30. Also surrounding each adapter hole 22 in each column 30 are two smaller alignment holes 26 which accommodate alignment pins 86, 87 (see FIG. 5b) on the carriers being repositioned on the reverse side of plate 10.

Figure 2:
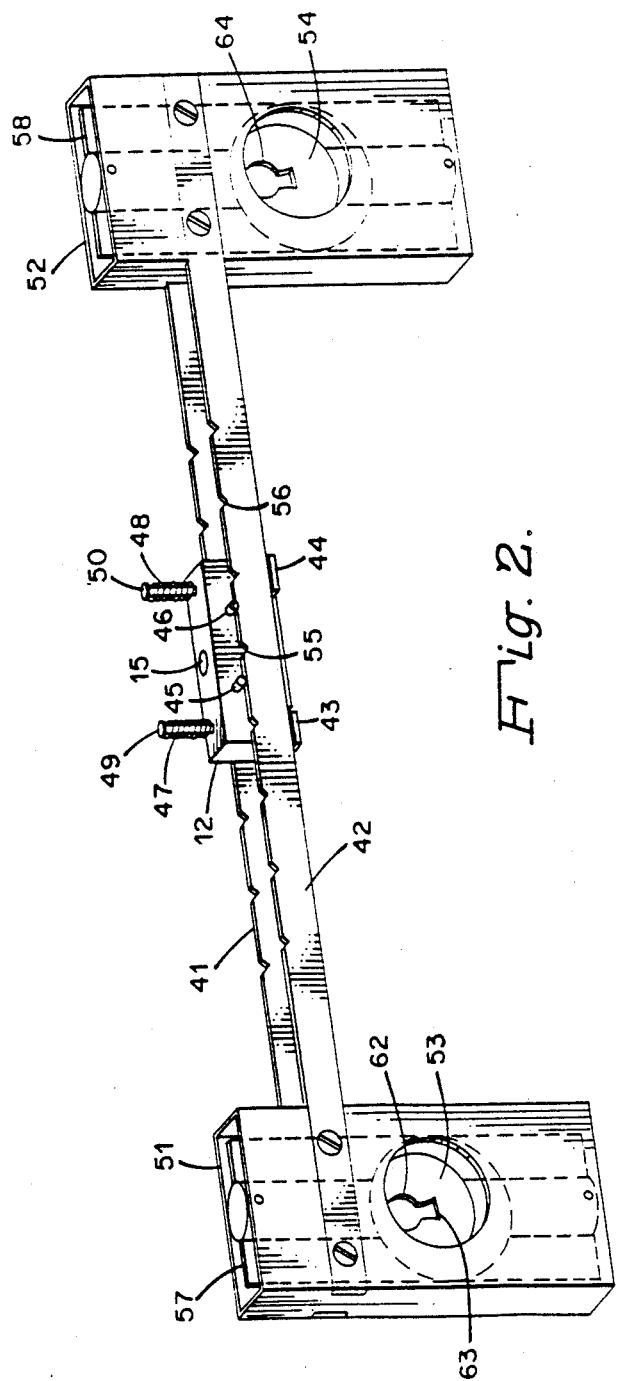
FIG. 2 is a perspective view of the carrier translation means used in the crossconnect switch of FIG. 1.
Figure 3:
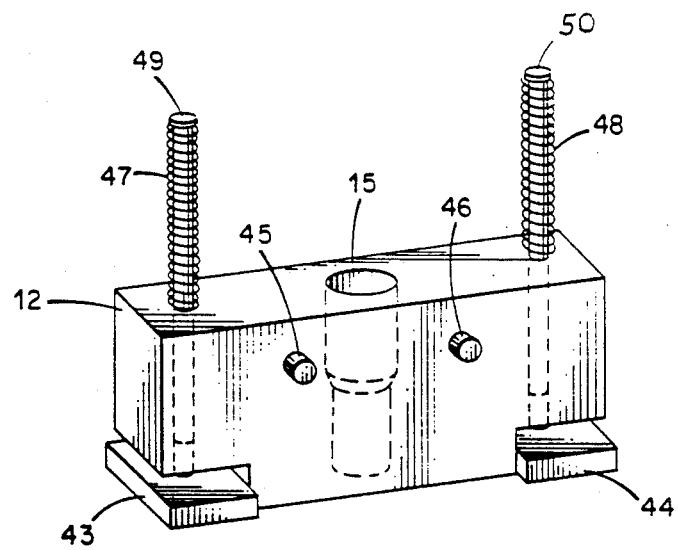
FIG. 3 is a perspective view of the repositioning carrier used in the crossconnect switch of FIG. 1.

Referring now to FIGS. 1 and 2, each connector carrier is lifted from contact with plate 10, translated, and then lowered back into contact with plate 10 by a pair of narrow walking beams 41 and 42 shown in proximity with connector carrier 12 in FIG. 2. The pair of walking beams 41, 42 extend through rectangular slots 16, 17, 18, and 19 in frame 11 and are held rigidly parallel at their ends by cam retainers 51 and 52 which are located outside frame 11. These cam retainers 51, 52 cause walking beams 41 and 42 to move in a circular motion truncated by the vertical constraint imposed by the limited heights of rectangular slots 16, 17, 18, and 19. Each connector carrier 12 fits between its pair of walking beams 41, 42 and is held in position by two cross feet 43 and 44 as shown in detail in FIG. 3. These cross feet are lifted by compression springs 47 and 48 via connecting rods 49 and 50. Together with transverse pins 45 and 46 they clamp connector carrier 12 onto walking beams 41 and 42. The optical connectors passing through hole 15 of carrier 12 are detailed in FIGS. 5a and 5b, and will be discussed later.

In their nominal position, walking beams 41 and 42 press cross feet 43 and 44 down against plate 10. Connecting rods 49 and 50 which pass through carrier 12 hold compression springs 47 and 48 in place against carrier 12. This holds carrier 12 in contact with plate 10 with its alignment pins 84, 85 (FIG. 5b) inserted into the alignment holes 24 of plate 10 and with connector hole 15 aligned with one adapter hole 22.

Figure 4:
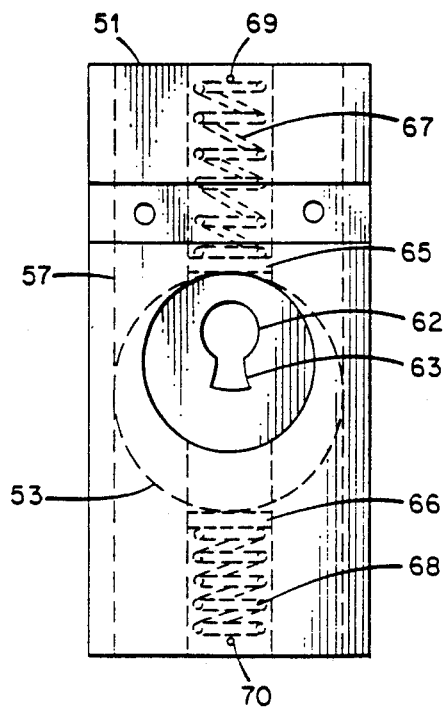
FIG. 4 is a front plan view of the cam retainer of the carrier translation means of FIG. 2.

FIGS. 2 and 4 illustrate the repositioning mechanism for carrier 12. Both figures show a circular cam 53, 54 in cam retainers 51, 52, respectively. As circular cams 53 and 54 within cam retainers 51 and 52 rotate clockwise, beams 41 and 42 first slide to the left, then rise so that V groove pairs 55 and 56 on walking beams 41, 42 engage pins 45 and 46 on carrier 12 and lift carrier 12 away from plate 10. Then the beams reach their vertical limit imposed by the heights of rectangular slots 16, 17, 18, and 19, the alignment pins 84, 85 on carrier 12 and the expanded beam optical connector 120 (FIG. 5b) within carrier 12 are disengaged from plate 10, its alignment holes 24, and the adapter hole 22. As the cams 53, 54 continue to rotate, carrier 12 is translated to the right along row 23 and lowered into contact with plate 10 to reengage its alignment pins 84, 85, thereby repositioning the optical connector 120 in an adjacent adapter hole 22. During the last quarter revolution of the cams 53, 54, beams 41 and 42 slide to the left to their nominal positions and press cross feet 43 and 44 down against plate 10. Similarly, one full counterclockwise rotation of the cams 53, 54 within each cam retainer 51, 52 will reposition carrier 12 at the oppositely adjacent adapter hole 22 in plate 10.

Outside frame 11 and passing through bearing holes 13 and 14, in the side wall extensions of frame 11, is shaft 60 which passes through a drive axis hole 62 in cam 53, shown in FIG. 2. Along shaft 60 are eight pins 73 all nominally pointed downward so as to pass through slot 63 of drive hole 62 as shaft 60 is translated. Circular cam 53 only rotates with shaft 60 when the latter is translationally positioned such that pin 73 is aligned with the thickness of cam 53. Its center is offset from the shaft axis by half the spacing between adjacent adapter holes on plate 10. When it rotates within vertical channel 57 of cam retainer 51, cam retainer 51 is translated left and right. Above and below cam 53 in FIG. 4. are two disks 65 and 66 pressed against cam 53 by springs 67 and 68 which are held within cam retainer 51 by pins 69 and 70. These cause cam retainer 51 to also move up and down as cam 53 rotates, but permits the vertical component of the otherwise circular motion to be truncated as the movement of beams 41 and 42 is limited by rectangular slots 16, 17, 18, and 19.

For the eight-by-eight switch matrix of FIG. 1, there would be eight carriers 12 and each of the eight expanded beam connector carriers 12 on the top side of plate 10 would be similarly repositioned by a pair of walking beams moved by a pair of cams within cam retainers. The thickness of these cams is one eighth their spacing along their shaft. The pins 73 through shaft 60 are offset by differing amounts at each cam such that a single cam may be selected by appropriately translating the shaft 60 along its axis. Thus, the repositioning of an expanded beam connector carrier 12 in its row is accomplished by translating the pair of shafts 60 and 61 together to engage cams 53 and 54 at the selected row 20, and then rotating the two shafts one revolution either clockwise to move the carrier 12 to the right, or counterclockwise to move it to the left.

The entire above described mechanisms are duplicated on the bottom side of plate 10 (not shown) but operate in perpendicular directions along columns 30 rather than along rows 20. At the ends of each parallel pair of shafts 60, 61, and their counterparts for the reverse side of plate 10, is a chain link coupling (not shown) to keep their rotations synchronized. The translational motion that selects the row or column may be provided by an incremental linear actuator and the subsequent rotation may be provided by an incremental rotary actuator. Both devices are well-known in the art as various types of stepping motors. The two linear and two rotary actuators required to reposition the optical connector carriers on both sides of this optical fiber crossconnect switch are connected to a microcontroller which accepts switching commands from an external source and determines the appropriate sequence of actuator operations to arrive at the desired optical interconnections.

Figure 5A:
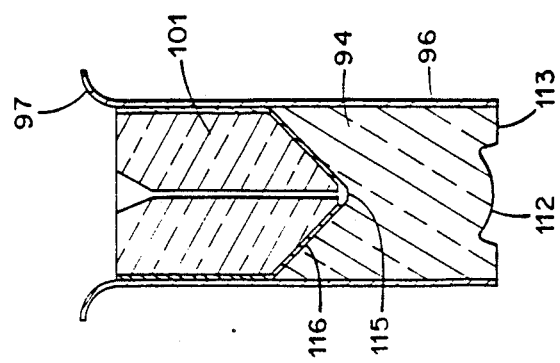
FIG. 5a is a cross-sectional view of the expanded beam connector lens assembly which may be used with the crossconnect switch of FIG. 1.

The details of the optics within the connector carriers 12 and the adapter holes 22 in plate 10 depend upon the type of optical connector that is to be repositioned. In FIG. 5b there is shown a cross-sectional view of connector carrier 12 on the top side of plate 10 and an identical connector carrier 82 on the bottom side. Alignment pins 84 and 85 are tapered near their ends to allow them to center into and penetrate alignment holes 86 and 87 (24 in FIG. 1) which lie between adjacent adapter holes 22 along row 23 of FIG. 1. Similar alignment pins on connector carrier 82 are not shown because it is oriented in a perpendicular position along column 34 of FIG. 1 Extending into the selected adapter hole 92 of plate 10 from opposite sides are two expanded beam connector shells 88 and 89 held in by threaded caps 90 and 91. Within these shells are two glass expanded beam connector lenses 94 (FIG. 5A) and 95. Both lenses are molded from glass and consist of a convex lens surface 112, an annular flat reference surface 113 forward of the lens surface, and a fiber alignment indent 115 at the bottom of conical rear surface 116 as described in U.S. Pat. No. 4,421,383. The flat forward reference surfaces 113 mate and bring the two lenses 94, 95 into coaxial angular alignment, while adapter hole 92 in plate 10 insures their lateral alignment. Cylindrical metal sleeve 96 has a rim 97 at its top against which spring 93 presses lens 94 into firm contact with its mating lens 95. Cleaved optical fiber 99 is brought into detent 115 by glass ferrule 101 cemented into the rear conical surface 116 (FIG. 5a). There it is precisely located at the focal point of lens surface 112 and optically coupled by a small volume of refractive index matching gel (not shown) between the cleaved end surface of fiber 99 and the bottom of the indent.

Alternatively, connector carriers 12 and 82 can be designed to accommodate other fiber optic connectors including butt types, by making the adapter holes in plate 10 sufficiently precise to insure efficient optical energy transfer.

A principal advantage of the optical fiber crossconnect switch of the present invention is that it does not introduce any additional optical loss beyond that normally associated with the mating of the pair of connectors with which it is used. This optical crossconnect switch is insensitive to the polarization state of the optical signals on the fibers being switched, and the switch crosstalk is essentially zero.

Another feature of the invention is that the electromechanical cross connection of n input and n output fiber optic connectors through adapters is achieved such that the fibers cannot become entangled after multiple reconfigurations.

A further feature is that this nonblocking electromechanical fiber optic crossconnect switch allows all possible interconnections between fibers terminated in standard connectors.

We claim:

1. An optical fiber crossconnect switch for the reconnection of n input optical fibers, with n output optical fibers, comprising:
   a plate having an n-by-n array of optical fiber connection adapters;
   n input optical fibers terminating on a first side of said plate, each of which is repositionable along one row of said array to any of n positions each in a different column of said array;
   n output optical fibers terminating on a second side of said plate opposite to said first side, each of which is repositionable along one column of said array to any of n positions each in a different row of said array; and
   repositioning means on each side of said plate, comprising:
   2n carriers, one carrier for each of said n input and n output optical fibers;
   means to secure one optical fiber in each of said carriers;
   means to position each of said n input optical fiber carriers over one of said n rows of adapters on a first side of said plate;
   means to position each of said n output optical fiber carriers over one of said n columns of adapters on said second side of said plate;
   means to raise and lower each of said carriers to disengage and engage said optical fiber within said carrier from and into an adapter; and
   means to move said carrier from a first adapter position to a second adapter position in the same column or row;
   whereby each of said 2n optical fibers may be repositioned by withdrawing it from one of said adapters, translating said optical fiber along a row or column and reinserting said optical fiber into an adjacent adapter in the same row or column;
   such that any one of said n input optical fibers terminating on one side of said plate may be connected through one of said adapters to any one of said no output optical fibers terminating on said second side of said plate, whereby said output optical fiber will carry the same light that entered at the input optical fiber to which it is connected.

2. The optical crossconnect switch of claim 1 further including:
   alignment means to align said carrier precisely over an adapter for precise engagement of said optical fiber within said carrier to said adapter.

3. The optical crossconnect switch of claim 1 wherein said means to reposition each carrier further comprises:
   a frame around the perimeter of said plate, the side walls of said frame being perpendicular to said plate surfaces and extending on a first axis above and below said plate and beyond the edges of said plate on a second axis;
   a pair of walking beams extending longitudinally along each row of n adapters on the first side of said plate;
   a pair of walking beams extending laterally along each column of adapters on a second side of said plate;
   said walking beams extending through rectangular slots in said frame at each end thereof;
   a cam retainer at each end of each pair of walking beams to hold said beams rigidly parallel;
   said cam retainers further comprising cam means to cause said walking beams to move in a circular motion truncated by the vertical constraint imposed by the limited height of said slots;
   said carrier being positioned between and secured to said walking beams;
   said carrier further comprising:
   two spring-loaded cross feet which may be raised to move said carrier and lowered to secure and said carrier to said plate; and
   transverse pins to position said carrier relative to said walking beams for translational movement of said carrier.

4. The optical fiber crossconnect switch of claim 3 wherein said carrier further comprises:
   a plurality of alignment pins positioned on the base of said carrier such that said pins may be received into corresponding alignment holes on said plate adjacent to said adapters for precise alignment of said optical fibers.

5. The optical fiber crossconnect switch of claim 3 wherein said spring loaded cross feet and said transverse pins serve to clamp said carrier to said walking beams.

6. The optical fiber crossconnect switch of claim 3 wherein said repositioning means further comprises:
   cam means within said cam retainer to cause a rotary motion of said walking beams, said rotary motion being limited by said slots;
   such that a clockwise rotary motion causes said walking beams to slide in a first direction, then rise so that said V groove pairs engage said transverse pins and lift said carrier away from said plate, causing said optical fiber and said alignment pins to disengage from said plate at the peak of the truncated vertical motion; and
   as said cam means continues to rotate, said carrier is translated in said first direction and lowered into contact with said plate to reengage said alignment pins, thereby repositioning said optical fiber in an adjacent adapter; with
   said cross feet pressing against said plate.

7. The optical crossconnect switch of claim 6 wherein said means to reposition further comprises:
   means to cause said cam to rotate counterclockwise, thereby translating said carrier in a second direction opposite to said first direction; such that each rotation moves said carrier to the next adjacent adapter position.

8. The optical fiber crossconnect switch of claim 7 wherein said repositioning means further comprises:
shafts secured to extended sidewalls of said frame;
a plurality of pins on said shafts, one pin for each cam means on each end of said walking beams;
means to translate said shafts longitudinally so that at least one pin engages at least one cam means; and
means to rotate said shaft.

9. An optical fiber crossconnect switch for the reconnection of n input optical fibers, each terminated in a standard connector device, with n output optical fibers, each terminated in a standard connector device, comprising:
a plate having an n-by-n array of optical fiber connector adapters;
n input optical fiber connectors on a first side of said plate, each of which is repositionable along one row of said array to any of n positions each in a different column of said array;
n output optical fiber connectors on a second side of said plate opposite to said first side, each of which is repositionable along one column of said array to any of n positions each in a different row of said array; and
repositioning means on each side of said plate, comprising:
2n carriers, one carrier for each of said 2n optical fiber connectors;
means to mount one optical fiber connector in each of said carriers;
each of said first n carriers being positioned over one of said n rows of adapters on said first side of said plate;
each of said second n carriers being positioned over one of said n columns of adapters on said second side of said plate;
means to raise each of said carriers to disengage said connector within said carrier and means to lower each of said carriers to engage said connector in an adjacent one of said adapters; and
means to move said carrier linearly from one adapter position to another adapter position in the same row or column;
whereby each of said 2n optical fibers may be repositioned by withdrawing its connector from one of said adapters, translating said connector along a row or column and reinserting said connector into an adjacent adapter in the same row or column;
such that any one of said n input optical fibers terminated in a standard connector on one side of said plate may be connected through one of said adapters to any one of said n output optical fibers terminated in a standard connector on said second side of said plate, whereby said output optical fiber will carry the same light that entered at the input optical fiber to which it is connected.

10. The optical crossconnect switch of claim 9 further including:
alignment means to align each of said carriers precisely over one of said adapters for precise engagement of said connector to said adapter.

11. The optical crossconnect switch of claim 9 wherein said means to reposition each carrier further comprises:
a frame around the perimeter of said plate, the side walls of said frame extending perpendicularly to said plate surfaces above and below said plate, and longitudinally beyond the edges of said plate;
a pair of walking beams extending longitudinally along each row of n adapters on said first side of said plate;
a pair of walking beams extending laterally along each column of adapters on said second side of said plate;
said walking beams extending through rectangular slots in said sidewalls of said frame at each end thereof;
a cam retainer at each end of each pair of walking beams to hold said pair of beams rigidly parallel;
said cam retainers further comprising means to cause said walking beams to move in a circular motion truncated by the vertical constraint imposed by the limited height of said rectangular slots;
said carrier being positioned between said walking beams;
said carrier further comprising:
two spring-loaded cross feet which may be raised or lowered; and
transverse pins to position said carrier relative to said walking beams.

12. The optical fiber crossconnect switch of claim 10 wherein said alignment means further comprises:
a plurality of alignment pins positioned on the base of said carrier such that said pins may be received into corresponding alignment holes on said plate adjacent to said adapters for precise alignment of said optical fiber connectors.

13. The optical fiber crossconnect switch of claim 11 wherein said spring loaded cross feet and said transverse pins serve to clamp said carrier to said walking beams.

14. The optical fiber crossconnect switch of claim 11 wherein said repositioning means further comprises:
cam means within said cam retainer to cause a rotary motion of said walking beams, said rotary motion being limited by said rectangular slots;
such that a clockwise rotary motion causes said walking beams to slide in a first direction, then rise so that said V groove pairs engage said transverse pins and lift said carrier away from said plate, causing said connector and said alignment pins to disengage from said plate at the peak of the truncated vertical motion; and
as said cam means continues to rotate, said carrier is translated in said first direction and lowered into contact with said plate to reengage said alignment pins, thereby repositioning said optical connectors in an adjacent adapter; with
said cross feet pressing against said plate.

15. The optical crossconnect switch of claim 14 wherein said means to reposition further comprises:
means to cause said cam to rotate counterclockwise, thereby translating linearly said carrier in a second direction; such that each rotation moves said carrier to the next adjacent adapter position.

16. The optical fiber crossconnect switch of claim 15 wherein said repositioning means further comprises:
shafts secured to extended sidewalls of said frame;
a plurality of pins on said shafts, one pin for each cam means on each end of said walking beams;
means to translate said shafts longitudinally so that at least one pin engages at least one cam means; and
means to rotate said shaft.

* * * * *